Nov. 3, 1953 — C. A. WELCH — 2,658,132
REMOTE-CONTROL SYSTEM FOR DIRECT CURRENT WELDING
Filed Jan. 6, 1950 — 2 Sheets-Sheet 1
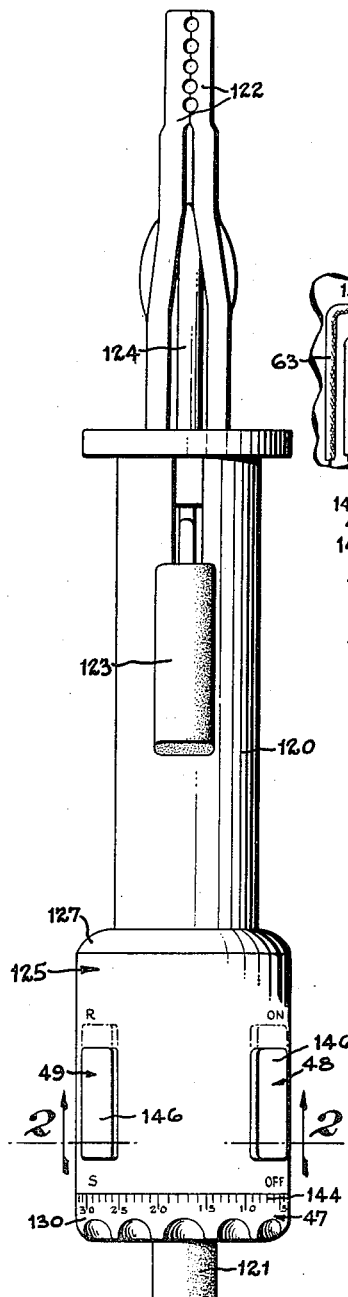
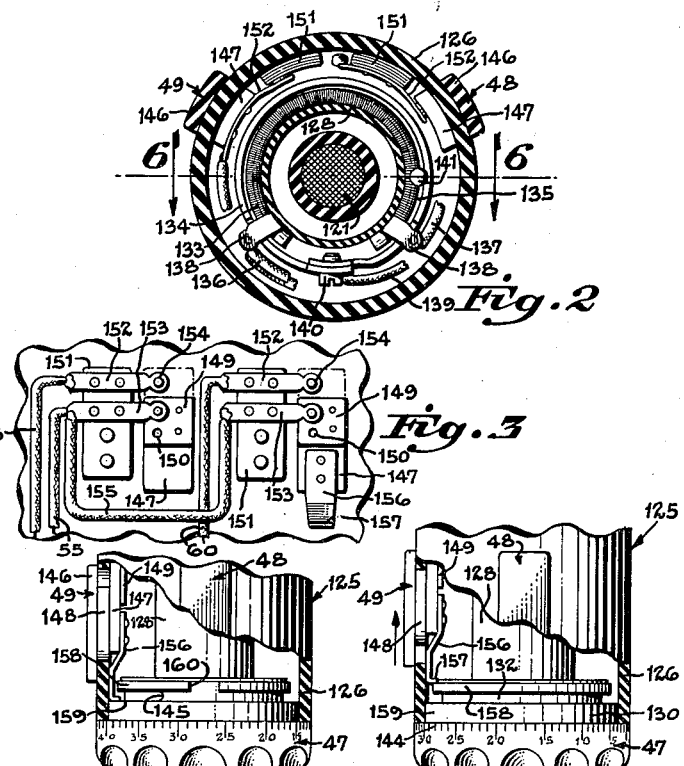
INVENTOR.
Claude A. Welch
BY
Wood, Arey, Herron & Evans
ATTORNEYS.

Nov. 3, 1953        C. A. WELCH        2,658,132

REMOTE-CONTROL SYSTEM FOR DIRECT CURRENT WELDING

Filed Jan. 6, 1950        2 Sheets-Sheet 2

INVENTOR.
Claude A. Welch
BY
Wood, Arey, Herron & Evans
ATTORNEYS.

Patented Nov. 3, 1953

2,658,132

UNITED STATES PATENT OFFICE 2,658,132

REMOTE-CONTROL SYSTEM FOR DIRECT CURRENT WELDING

Claude A. Welch, Cincinnati, Ohio, assignor to Welch Electric Company, Incorporated, Cincinnati, Ohio, a corporation of Ohio Application January 6, 1950, Serial No. 137,215

10 Claims. (Cl. 219—4)

This invention relates to direct current welding and particularly concerns a welding system which permits the operator to exercise remote control over the volt-ampere characteristics of a direct current welding generator from the handle of the electrode holder at the site of the work even though the welding generator furnishing the energy for welding may be at a remote point.

In commercial D. C. welding practice, it is usually necessary to utilize an alternating current energy source to supply D. C. components to the field winding of a direct current welding generator. Consequently, D. C. welding control systems of this type must provide means for rectifying the A. C. source energy so that only D. C. components are applied to the field of the D. C. generator as well as means for controlling the magnitude of the rectified A. C. current applied to the generator and consequently the output of the generator. Moreover, for maximum operating efficiency, it is highly desirable to provide built-in remote control means in the handle of the electrode holder so that the operator may conveniently adjust the generator output without interrupting his work.

Heretofore, a number of systems have been proposed which are intended to permit the operator to exercise remote control over the output characteristics of a D. C. welding generator, but none have proved to be sufficiently rugged or practical for prolonged successful commercial operation. For example, in the past, systems of this type have included utilized fragile grid-controlled, mercury vapor rectifiers or so called thyratron tubes. These systems are undesirable because the tubes have to be preheated before they can be operated, require power for filament energizing current, and are too delicate to withstand the rough usage to which they are subjected to in the shop or field. Other systems have proposed control of the D. C. generator output by complex electro-mechanical devices which insert or withdraw resistance from the supply circuit to the generator field winding. The very nature of such equipment makes it too impractical or costly for commercial utilization. As a consequence, prior remote control systems intended to enable the operator to conveniently adjust the output characteristics at the electrodes from the electrode holder have not achieved commercial acceptance despite the obvious utility of such systems.

The object of the present invention is the provision of an electrical control circuit of simple, inexpensive, durable construction including a primary control device which is adapted to be built into the handle of a welding electrode holder and which is effective to enable an operator conveniently to control the volt-ampere characteristics of the D. C. generator. In accordance with this invention, the handle control means dominates the electrical control circuit which in turn governs the operation of the welding generator.

The voltage and amperage output of a direct current generator may be varied conveniently by adjustment of the excitation of the field winding of the generator, as is well known by those skilled in the art. This invention is predicated upon the principle of rectifying alternating current to a pulsating direct current to provide the energy for exciting the field winding of the welding generator, and modifying the magnitude of the excitation energy by the use of a saturable reactor in which the degree of saturation is controlled conveniently from a variable resistance or potentiometer. More specifically, the field winding of the generator is coupled, directly or indirectly, with the output terminals of a rectifier which is fed with alternating current through a saturable reactor and the saturable reactor is provided with a control winding constituting part of a control circuit which includes a variable resistance adapted to be adjusted manually by the operator at the site of welding. The significance of this arrangement is that it provides practical means for the remote control of a direct current welding generator set, and it enables low control voltages to be employed in conjunction with equipment of a rugged and durable nature. The variable resistance need be only a unit of relatively small size and, therefore, it may be installed in or attached to the handle of a welding electrode where the operator readily may reach its control knob to adjust the welding generator output voltage and amperage characteristics without leaving the site of his work. Moreover, the relatively low voltages which prevail in the control circuit do not require special precautions in respect to insulation, and the leads to the variable resistance or potentiometer in the welding electrode holder may be associated directly with the generator output leads which carry the heavy welding currents to the electrode.

In the practice of the invention, the saturable reactor may be housed within a box adapted for association with or direct attachment to the physical welding generator equipment, and the control circuit, which includes the variable resistance and saturable control winding of the reactor, may be energized from a separate rectifier having its input in connection with the alternating current supply to the machine, or the control circuit may be energized from any other suitable source.

In one typical embodiment of the invention, the main windings of the saturable reactor carry alternating current which is impressed upon the input terminals of the exciter rectifier, and in this arrangement an adjustment of the control resistance in the control circuit varies the degree of saturation of the rectifier, which, in turn, effects the reactor impedance and thereby adjusts the alternating current which is impressed upon the exciter rectifier. In a modified form of structure, energy for excitation of the welding generator is furnished from a separate direct-current generator, and the exciting current of the exciting generator, in turn, is governed by control of the degree of saturation of a saturable reactor which furnishes exciting energy to it through uni-directional half-wave rectifiers. This arrangement, though somewhat more expensive than the first one, provides advantages in eliminating the effects of residual magnetism in the reactor core, and, of course, is particularly adapted for use in conjunction with welding generators which are equipped with separate field exciters. As a further alternative, the saturable reactor output may be arranged for full-wave rectification through half-wave rectifiers in a control circuit of the type first described.

It is also the concept of this invention to provide remote control means which also can be located in the handle of the electrode holder for conveniently starting and stopping the generator drive motor and effecting reversal of polarity at the welding electrodes. This is accomplished through separate circuits which control a polarity reversing switch and a motor start-stop switch respectively. These circuits are energized from the low-voltage supply circuit to the generator field winding and consequently achieve a maximum economy of operation. Moreover, they are so arranged in conjunction with the leads of the generator control circuit that they may be bound with the welding cable and the number of leads in the control unit to the electrode holder reduced to a bare minimum.

Other objects and advantages of this invention will be apparent to those skilled in the art from the following description of the drawings in which:

Figure 1 is a top plan view of a typical electrode holder including the remote control attachment for the circuit of this invention.

Figure 2 is a cross sectional view of the holder attachment taken along lines 2—2 of Figure 1.

Figure 3 is a diagrammatic flattened view of the curved inside surface of the electrode holder handle showing the polarity reversing and start-stop switches.

Figure 4 is a fragmentary view of the cable and of the electrode handle showing the control attachment with the polarity reversing switch in open position.

Figure 5 is a view similar to Figure 4 but showing the polarity reversing switch in closed position.

Figure 6 is a cross sectional view taken along line 6—6 of Figure 2.

Figure 7:
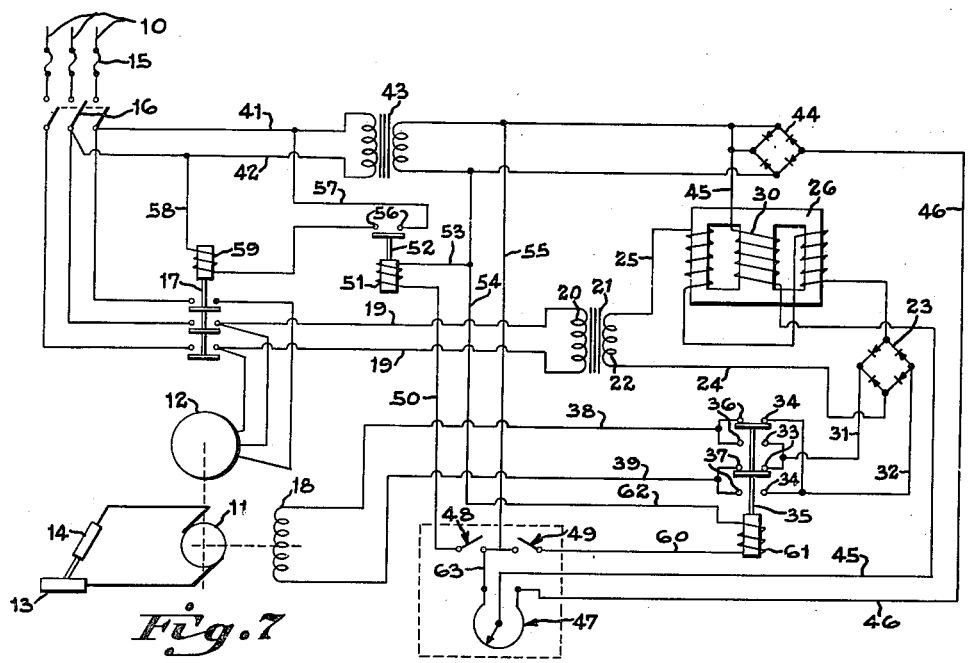
Figure 7 is a diagrammatic view of a circuit embodying the preferred form of this invention.

A preferred form of control circuit embodying this invention is shown in Figure 7. The circuit which is energized from leads 10 from a convenient source of alternating current such as a three phase 60 cycle source, is adapted to control the volt-ampere characteristics of a D. C. welding generator 11 which is driven by a generator drive motor 12 and supplies current to welding electrodes 13 and 14. The power lines 10 include protective fuses 15, a main switch 16, and lead through a motor starter contactor 17 to the drive motor 12. The above units are well known in the art and do not constitute a part of the present invention.

The field 18 of the generator 11 is D. C. excited and the control circuit of this invention effects the generator output by control of this field. Power for the generator field voltage is supplied through lines 19 connected across a single phase of the source lines 10 and leading to the primary 20 of a transformer 21. Secondary 22 of the transformer is connected across the A. C. terminals of a rectifier 23 which is preferably of the metallic disk type by means of connecting leads 24 and 25. This rectifier is introduced in the circuit for the purpose of transforming the A. C. source energy into rectified A. C. (hereinafter called D. C.) input for the excitation of the D. C. generator field winding. Control of the A. C. supply to the rectifier 23 and consequently the D. C. output of the rectifier is achieved by means of a three-legged saturable reactor 26.

The center leg of the saturable reactor is wrapped with a coil 30 carrying D. C. current supplied from an auxiliary circuit which will hereinafter be described. Line 25 carrying A. C. current is coiled in series connection about the outside legs of the reactor. Those skilled in the art will appreciate that the A. C. output of lines 24 and 25 is controlled by the characteristics of the D. C. passing through the center coil 30, increasing as the D. C. current is raised and decreasing as the D. C. current is lowered. The D. C. current passing through coil 30 tends to saturate the reactor with a resultant reduction in the impedance of the A. C. circuit which line 25 is a part. Consequently, the D. C. current is increased through coil 30, the core of the reactor approaches saturation, the impedance is reduced and the A. C. current through line 25 increases. Conversely, as the magnitude of the D. C. decreases, impedance increases and the value of A. C. current in line 25 drops. The A. C. current components, since they change direction rapidly, have no effect on the saturation of the core.

The D. C. output of rectifier 23 is taken from the D. C. terminals and fed through leads 31 and 32 to the branch contacts 33 and 34 of a polarity reversing switch 35. The opposite contacts 36 and 37 of the switch are connected to lines 38 and 39 which lead to the terminals of the generator field coil 18. Thus, the volt-ampere characteristics of the D. C. field coil of the generator and consequently the generator output are controlled by the strength of the D. C. current supplied to the coil 30 of the saturable reactor.

The auxiliary circuit which permits remote control of the generator field from the electrode holder handle comprises lead lines 41 and 42 taken from the source lines 10 and connected across the primary of a transformer 43. When the main switch 16 is closed, the primary of the transformer 43 is energized and the output voltage is reduced through the secondary to permit it to be used as a control voltage and to supply the input to a rectifier 44 which is also of the metallic disk type. This rectifier supplies D. C. current through leads 45 and 46 to the coil 30 of the saturable reactor, and is controlled by an adjustable potentiometer 47, connected in series with leads 45 and 46 and located in the handle of the electrode holder. Adjustment of the potentiometer results in variation of the resistance of the circuit from the D. C. output terminals of rectifier 44 through the D. C. coil 30 of line 45 and back through line 46. Consequently, by selectively adjusting the potentiometer, the operator can vary the current through the D. C. winding 30 on the reactor, control the A. C. output to rectifier 23 and consequently control the D. C. output from rectifier 23 to the generator field winding 18.

Also located in the handle of the electrode holder, which is indicated diagrammatically by the dotted square in Figure 7, is switch 48 which controls the motor starter contactor 17. This switch is connected through lead 50 to the coil 51 of a solenoid actuated relay 52. The other end of the coil 51 emerges as a lead 53 and the circuit is completed by returning to switch 48 through lines 54 and 55 connected across the low voltage side of transformer 43. Thus, closing switch 48 will result in closing the circuit just described and energization of the solenoid relay 52.

When this relay is activated, it bridges contacts 56 which are the terminals of leads 57 and 58 connected across the high voltage side of transformer 43. Lead 58 includes solenoid coil 59 which actuates motor starting contactor 17. Obviously, the opening of switch 48 will result in the de-activation of relay 52, breaking of the circuit controlling solenoid 59, and the withdrawal of starter contact 17 from operative position, thus stopping the motor 12.

Switch 49 which controls the polarity reversing relay 35 is also located in the electrode handle and makes or breaks the circuit through lead 60 which includes the coil of a solenoid 61 controlling the polarity reversing relay. The other end of the coil terminates in line 62 connected to line 54 which as previously described returns to the low voltage side of transformer 43. The main circuit is completed through line 55 extending from the terminal of the low voltage side of the transformer 43 to the switch 49. Thus, closing switch 49 results in activation of solenoid 61, causes relay 35 to establish a new set of contacts and reverse the polarity of the field 18.

Those skilled in the art will readily appreciate the economy achieved by energizing both the polarity reversing circuit and the motor starting circuit from the low voltage side of transformer 43. Moreover, by virtue of the arrangement shown, the number of conductors which must be extended from the control unit to the electrode holder is kept to a minimum. Lines 45, 46, 50, 55 and 60 are the only conductors which extend to the electrode holder other than the welding cable. It will also be observed that line 55 is connected to the terminus of potentiometer 47 through a lead 63 which also results in the reduction in the number of conductors necessary.

By way of illustration, but not by way of limitation, the following data is given to illustrate one machine constructed according to the invention:

A satisfactory system which was operated successfully from a three phase 60 cycle source in conjunction with a 300 ampere Hobart type welding generator has utilized a reactor having a winding of 620 turns on each A. C. winding and 3000 turns on the D. C. winding. These windings are coiled on a core 1½ inches thick fabricated from laminations of Allegheny Ludenum E-I 19 core iron. The power utilized through this reactor was 1100 watts at minimum D. C. excitation, which was drawn from a supplying transformer having that capacity, and approximately zero watts at maximum D. C. excitation. The voltage drop across the reactor varied from six to ninety volts within the range limits and a rectifier appropriate to this range was supplied. Power loss through the reactor was approximately 60 watts at maximum, with a 7 watt loss through the D. C. winding at minimum.

Figure 8:
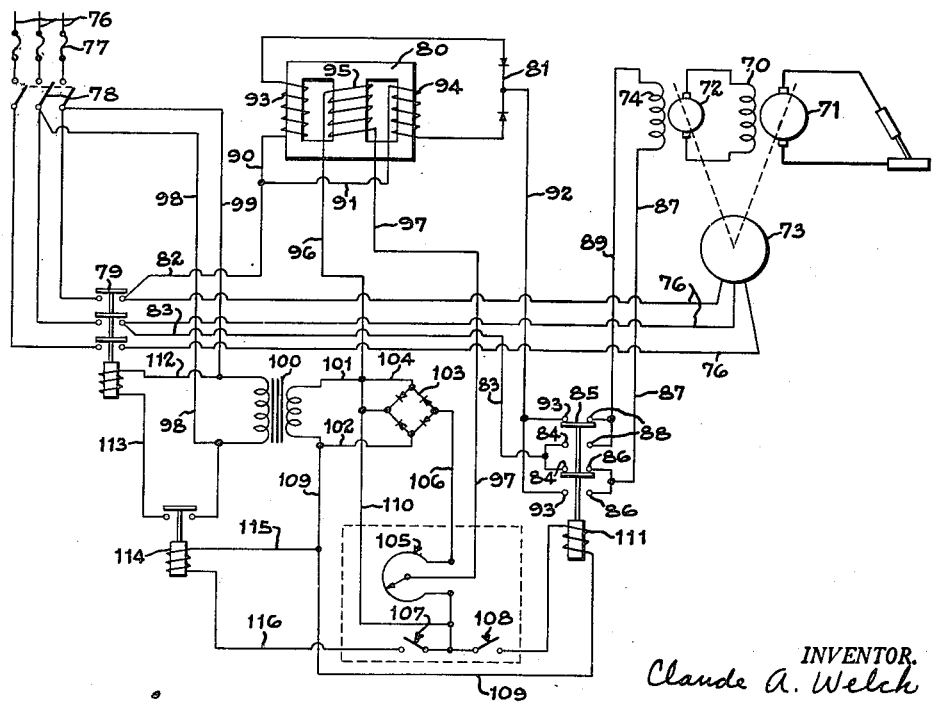
Figure 8 is a diagrammatic view showing a circuit embodying another form of this invention.

In Figure 8, an alternate circuit is shown which is also constructed in accordance with the principles of this invention. In this case however, the field 70 of the current welding generator 71 is excited by a separate auxiliary generator 72. Both generators are driven through a common shaft, indicated diagrammatically by dotted lines, of a motor 73. In this case, regulation of the volt-ampere characteristics of the welding generator is achieved by control of the D. C. potential supplied to the field 74 of the auxiliary generator. A particular advantage arising from this arrangement is the reduction of the power requirements of the control circuit. Those skilled in the art will readily appreciate that by virtue of this arrangement the total power requirement of the welding system is supplied chiefly by the electric motor 73. The use of the auxiliary generator 74 under conditions of high flux density permits material reduction in the power requirements of the control circuit.

In this case, as in the former, the drive motor 73 and the control circuit for the field winding are energized by power supplied through lead lines 76 from a convenient source of alternating current. For example, a three phase 60 cycle supply may be used although circuit conditions may be adapted to accommodate almost any available source of energy. In the embodiment shown, the lead lines 76 include fuses 77, a main switch 78 and are connected through a motor starter contactor 79 to the drive motor 73.

Full wave rectified A. C. current hereinafter referred to as D. C. current is supplied to the field winding 74 of the generator 72 through a controlled supply circuit which includes a saturable reactor 80 and a rectifier 81. Power is supplied to the circuit through leads 82 and 83 taken across a single phase of the lead lines 76. Lead 83 terminates in dual contacts 84 on one side of a polarity reversing switch 85. As those skilled in the art will understand, this switch can be selectively positioned to connect one of the contacts 84 to a contact 86 at the end of line 87 leading to one side of the generator field coil 74 or the other contact 84 to a contact 88 at the end of the line 89 leading to the other side of winding 74.

The other lead 82 proceeds toward the saturable reactor and branches into lines 90 and 91 which proceed in parallel across the saturable reactor 80 and meet in line 92 which leads to the reversing switch 85. Contacts 93 at the end of line 92 can be selectively connected through the switch to either contacts 88 or 86 on the generator field service lines 89 and 87 respectively.

It will be observed that the connections through the saturable reactor 80 and the rectifier 81 are different in this circuit than they are through the counterpart of these elements in the circuit shown in Figure 7. In this case, lines 90 and 91 include coils 93 and 94 respectively which are wrapped around the outside legs of the reactor 80 and are arranged in parallel circuit relationship with each other. Lines 90 and 91 are connected to the opposite sides of rectifier 81 and by virtue of this connection are unilateral in nature permitting current to pass through them only in the direction of the arrows shown in the rectifier connection in each line. Hence, lines 90 and 91 alternately carry half wave rectified currents and the current supplied to line 92 is the product of full wave rectification. The center core of the reactor 80 is wrapped with a coil 95 which is supplied with D. C. current through lines 96 and 97. By controlling the current through coil 95, the output of rectifier 81 is controlled quite readily.

It will be observed that by virtue of this arrangement substantially less power is required in the control circuit. Since at any given instant, there is only a D. C. component in the coils 93 and 94 on the outer legs of the reactor, the current flowing through these coils serves to expedite the saturation of the core in a step process. In effect, the current passing through the coils 93 and 94 in tending to saturate the core, progressively diminishes the core impedance and consequently permits larger currents to flow in the windings 93 and 94 until saturation or near saturation is reached. Consequently, less power is required in the circuit to saturate the core because the D. C. in coil 95 is supplemented by the D. C. components in coils 93 and 94. It will be observed however, that the ultimate control is achieved by regulation of the direct current passing through the central winding 95.

The D. C. control circuit for the middle coil 95 of the saturable reactor is substantially similar to the corresponding circuit of the system shown in Figure 7. Power is taken from the source lines 76 through leads 98 and 99 and fed to the primary of a transformer 100. The secondary of the transformer is connected through leads 101 and 102 to the A. C. terminals of a rectifier 103. This rectifier feeds D. C. current through a circuit which can be traced through line 104, line 96 to one end of coil 95, line 97 connected to the other end of coil 95, adjustable potentiometer 105 and return line 106. Adjusting the potentiometer will result in variance of the resistance in the circuit and the consequent control of the D. C. current passing through coil 95. Potentiometer 105 is of course located in the handle of an electrode holder.

The motor starting contactor 79 and the polarity reversing switch 85 are controlled by switches 107 and 108 respectively which are also located in the electrode holder handle. Since the control circuits which include these switches are practically identical to the control circuits of the system shown in Figure 7, a detailed description will not be made. In general, however, the polarity reversing switch control circuit which includes switch 108 comprises leads 109 and 110 connected across the low voltage side of transformer 100. Lead 110 proceeds through switch 108 and thence to solenoid 111 which actuates the polarity reversing switch. Lead 109 proceeds directly to the other side of the solenoid coil.

The solenoid of the motor starter contactor 79 is connected across the high voltage side of transformer 100 through lines 112 and 113. Line 113 passes solenoid actuated relay 114. The coil of this relay is actuated by a circuit which may be traced through conductor 115 leading to line 109 to one side of the secondary of transformer 100 and lead 116 which passes through switch 107 and returns the current to the other side of the secondary of transformer 100 through lead 110.

A typical electrode holder, which includes the control means adapted for use with the circuits shown in Figures 7 and 8, is shown in Figures 1 to 6. The electrode holder shown is of the type suitable in general for commercial use and those skilled in the art will understand that it is representative only. The control means of this invention can be adapted to almost any commercial type of holder. The holder shown comprises a tubular handle member 120 which houses the terminus of the welding cable 121. Projecting from the forward end of the handle are a pair of spring-urged jaws 122 which are adapted to clamp an electrode between them. The jaws are actuated by a manually operated lever 123 which drives an arm 124 into and out of spreading engagement with the jaws.

The control means of this invention are contained in a tubular housing indicated generally at 125 and attached to the cable end of the holder handle. Mounted in an exposed position on the housing are the switches 48 and 49, which control the motor starter contactor and the polarity reversing relay respectively, and the potentiometer 47. The numbers 47, 48 and 49 refer, in this instance, to the controls indicated diagrammatically in Figure 7, but it will be apparent that these controls can be the controls 105, 107 and 108 of the circuit of Figure 8. The housing 125 comprises a tubular side wall 126 fabricated from a suitable insulating material and which is attached to a collar 127 fitted around the end of the handle 120. The end of an insulated sleeve 128 is slip-fitted into the interior of the member 120 and is adapted to pass the welding cable 121. The sleeve collar and the outer wall are detachably fastened to the electrode handle 120 by means of screws 129. A hub 130 is rotatably mounted between the side wall 126 and the sleeve 128 and is free to turn relative to and between these members. The hub is prevented from being disconnected by means of a stop pin 131 screwed into the side wall 126 and projecting inwardly into an annular groove 132 in the hub 130.

A preferred form of potentiometer, indicated at 47 in Figure 1, is shown in detail in Figures 4, 5 and 6. Generally, it comprises a resistance coil 133 which is wrapped around the outside of sleeve 128. A band conductor 134 which is in the form of a flat copper strip circles the coil and is insulated from it by a non-conductive spacer 135. As best seen in Figure 2, leads 136 and 137 (corresponding to leads 63 and 46 in Figure 7) are connected to the opposite ends of the coil through straps 138—138 while the conductor band 134 has its own lead 139 (corresponding to lead 45 in Figure 7) which is fastened to the overlapping ends of the band by means of a screw 140.

Contact between the coil and the band is achieved through a contact ball 141 which is urged into bridging position between the band edge and the exposed side 142 of the coil by means of a spring 143 seated in the hub 130. Rotation of the hub will cause the ball to roll along the track formed between the band and the resistance coil and thus vary the resistance interposed in the circuit. Preferably, the outside of the hub is provided with graduated indicia 144 which may be chosen to represent volts, amperes or arbitrary units referable to a volt-ampere chart.

The operator is prevented from inadvertently turning the hub too far and running the ball off the track by shoulders 145, Figure 4, formed at the ends of groove 132 and which abut the stop pin 131. It will be apparent that the operator can set the potentiometer to any predetermined resistance value by rotating the hub until the graduations come into alignment with alignment marks scribed on the outside of the side wall 126 and thus he can conveniently and easily regulate the generator characteristics by adjustment of the potentiometer.

The construction of the motor contactor control switch 48 and the polarity reversing relay switch 49 is shown in Figures 2, 3, 4, and 5. Since they are practically identical in construction they will be described together. Each comprises a finger manipulated throw-block 146 which can be slid longitudinally along the side wall to open or shut position. Each block is rigidly connected to a slidable insulated block 147 on the inside of the tubular side wall 126 through a slot block 148. Movement of the outside block 146 in each instance will cause corresponding movement of the inside block 147.

Each block 147 carries on its inside surface a metallic conductor plate 149 provided with detent cavities 150. Fixed on the inside of the wall adjacent the path of movement of blocks 147 are insulated mounting pads 151 for a pair of spaced spring contactors 152 and 153. One end of each of the contactors 152 is connected to one of the leads 60 and 63 of the respective control circuits while one end of spring contactor 153 of switch 48 is connected to conductor 55 leading to the control circuit and to another conductor 155 leading to one end of contactor 153 of switch 49. The other end of each contactor extends laterally into the path of the shiftable plates 149. This end of each spring contactor is provided with a rounded portion 154 which rides upon the block surface and when properly positioned engages the detent cavities 150.

Hence, when either of the switches 48 or 49 is withdrawn toward the rear of the electrode handle, which is the position shown in full lines in Figures 1 and 3, the conductor plates 149 do not bridge the space between the portions 154 on the respective spring contactors 152 and the circuit is open. However, when the blocks are shifted forwardly to the positions shown in Figures 1 and 3, the conductors establish contact between the two rounded portions 154 on the respective spring contactors and the circuit is closed. It will be observed that the switch blocks are sustained against accidental drifting by engagement of the rounded portions 154 in the detent cavities 150 when the switch is in either opened or closed position.

A particularly novel feature of this invention resides in the construction of the polarity reversing switch 49. This switch is so constructed that it can only be thrown when the potentiometer is set at zero. In other words, the operator must set the potentiometer at the zero position so that all added resistance is withdrawn from the circuit before he can reverse the polarity of the generator field winding. The advantage of this provision is that it prevents the relay control from being thrown accidentally and inadvertently switching the generator field current during the welding operation. Moreover, it also insures the rapid reverse of the generator field. If the polarity reversing switch could be thrown when resistance is in the control circuit a static magnetic field established by the generator winding may be maintained without reversing for an indefinite period of time. However, by virtue of this provision reversing can only take place when no resistance is in the circuit and consequently the generator field reverses immediately.

In order to accomplish this purpose, the polarity reversing switch is provided with an angulated extension strip 156 which has a laterally projecting stop flange 157. When the switch is in opened position, this flange rides in groove 132 and is maintained therein by spaced annular shoulders 158 and 159. The foot is dimensioned so that it can only pass shoulder 158 when it is aligned with a slot 160 formed in shoulder 158. This alignment is only achieved when the hub is rotated so that the potentiometer is set to zero position.

When the polarity reversing switch is thrown to closed position, the stop flange has passed through the slot 160 and rides the other surface of shoulder 158. As shown in Figure 5, this shoulder stops the flange and prevents the switch from being thrown to open position unless the potentiometer is set to zero and slot 160 aligned with the flange. It will be observed that adjustment of the potentiometer hub is possible whether the switch 48 is open or closed.

Having described my invention, I claim:

1. A system for remotely controlling the output of a D. C. welding generator supplying current to a pair of welding electrodes by adjustment of the generator field excitation, said system comprising; a circuit for supplying rectified A. C. energy to the generator field from a source of A. C., said supply circuit including a rectifier and a saturable reactor for controlling the A. C. input from said source to said rectifier, and a control circuit including a control winding on said saturable reactor and a variable resistance installed in the handle of one of the electrode holders whereby variation of said resistance results in control of the energy supply to said control winding, adjustment of the A. C. input to said rectifier and consequent adjustment of the rectified A. C. input to said generator field.

2. A system for remotely controlling the output of a D. C. welding generator supplying current to a pair of welding electrodes comprising; means for supplying rectified alternating current to provide the energy for exciting the field winding of the generator, said means including a rectifier and a saturable reactor for controlling the input from an alternating current source to the rectifier, and a control circuit including a control winding on said saturable reactor and a variable resistance installed in the handle of one of the electrode holders whereby variation of said resistance results in control of the energy supply to said control winding, control of the A. C. input to said rectifier and consequent adjustment of the energization of said generator field.

3. In a control device for welding generators of the type including a supply circuit for supplying exciting energy to the field of said generator, said supply circuit including a saturable reactor for varying the output of said supply circuit, a control circuit for varying the saturation of said reactor, and a polarity reversing circuit for said generator, a remote control attachment adapted to be built into the handle of an electrode holder comprising; a switch controlling the polarity reversing circuit and a variable potentiometer controlling the energy supplied through said control circuit, said switch having stop means in cooperative engagement with said potentiometer to prevent the switch from being thrown except when said potentiometer is adjusted to zero resistance position.

4. A control device for governing the output characteristics of a direct current welding generator supplying current to a pair of welding electrodes, said generator having an excitable field winding, said control device comprising a source of exciting energy in circuit connection with the field winding of said generator, means for controlling the output of said source, said means including a saturable reactor in circuit controlling relationship with said source whereby the impedance of said reactor governs the output of said exciting source, said reactor including a control winding, a circuit for selectively varying the saturation of said reactor, said circuit including a source of direct current and a variable potentiometer in circuit connection with the control winding of said reactor.

5. A control device for governing the output characteristics of a direct current welding generator supplying current to a pair of welding electrodes, said generator having an excitable field winding, said control device comprising a source of exciting energy in circuit connection with the field winding of said generator, means for controlling the output of said source, said means including a saturable reactor in circuit controlling relationship with said source, whereby the impedance of said reactor governs the output of said exciting source, said reactor including a control winding, a circuit for selectively varying the saturation of said reactor, said circuit including a source of direct current and a variable potentiometer in circuit connection with the control winding of said reactor, said variable potentiometer being mounted in the handle of one of said electrode holders.

6. A control device for governing the output characteristics of a direct current welding generator supplying current to a pair of welding electrodes, said generator having an excitable field winding, said control device comprising means for supplying rectified alternating current to said field winding, said means including a rectifier and a saturable reactor in circuit connection with the field winding of said generator, said saturable reactor being effective to control the output from said rectifier, said reactor including a control winding, a circuit for selectively varying the saturation of said reactor, said circuit including a source of direct current and a variable potentiometer in circuit connection with the control winding of said reactor, said variable potentiometer being mounted in one of the electrode holders.

7. A system for remotely controlling the output of a D. C. welding generator supplying current to a pair of welding electrodes, said system comprising an auxiliary generator for supplying current to the field winding of the welding generator, means for controlling the output of said auxiliary generator, said means including a rectifier for supplying rectified alternating current to the field winding of said auxiliary generator, a saturable reactor in circuit connection with said rectifier for controlling the energization of said auxiliary generator field winding from said rectifier, and a control circuit for selectively adjusting the impedance of said reactor including a control winding on said saturable reactor and a variable resistance installed in the handle of one of the electrode holders, whereby variation of said resistance results in control of the energy supplied to said auxiliary generator field winding and consequent adjustment of the energization of said welding generator field winding.

8. A system for remotely controlling the output of a D. C. welding generator supplying current to a pair of welding electrodes, said system comprising an auxiliary generator for supplying current to the field winding of the welding generator, means for controlling the output of said auxiliary generator, said means including a rectifier for supplying rectified alternating current to the field winding of said generator, a saturable reactor for controlling the imput from an alternating current source to the rectifier, and a control circuit for selectively adjusting the impedance of said reactor including a control winding on said saturable reactor and a variable resistance installed in the handle of one of the electrode holders, whereby variation of said resistance results in control of the energy supply to said auxiliary generator field winding and consequent adjustment of the energization of said welding generator field, and a polarity reversing circuit connected across said rectifier and including a switch installed in one of said electrode holders.

9. A control device for governing the output characteristics of a direct current welding generator supplying current to a pair of welding electrodes, said generator having an excitable field winding, said control device comprising a means for supplying rectified alternating current to the field winding of said generator, said means including a rectifier and a saturable reactor for controlling the input from an alternating current source to said rectifier, said reactor including a control winding, a circuit for selectively varying the energization of said winding and hence the impedance of said reactor, said circuit including a source of direct current and a variable potentiometer in circuit connection with the control winding of said reactor, said variable potentiometer being mounted in the handle of one of the electrode holders.

10. A control device for governing the output characteristics of a direct current welding generator supplying current to a pair of welding electrodes, said generator having an excitable field winding, said control device comprising a means for supplying rectified alternating current to the field winding of said generator, said means including a rectifier and a saturable reactor for controlling the input from an alternating current source to said rectifier, said reactor including a control winding, a circuit for selectively varying the energization of said winding and hence the impedance of said reactor, said circuit including a source of direct current and a variable potentiometer in circuit connection with the control winding of said reactor, said variable potentiometer being mounted in the handle of one of the electrode holders, and a polarity reversing circuit connected across said rectifier and including a switch installed in one of said electrode holders.

CLAUDE A. WELCH.

References Cited in the file of this patent

UNITED STATES PATENTS

| Number | Name | Date |
| --- | --- | --- |
| 1,710,755 | West | Apr. 30, 1929 |
| 1,871,697 | James | Aug. 16, 1932 |
| 2,140,349 | Dawson | Dec. 13, 1938 |
| 2,229,952 | Whiteley et al. | Jan. 28, 1941 |
| 2,276,822 | Bowman et al. | Mar. 17, 1942 |
| 2,374,012 | Hanna | Apr. 17, 1945 |
| 2,425,183 | Hall | Aug. 5, 1947 |
| 2,456,938 | Harder | Dec. 21, 1948 |